US011982112B1

(12) United States Patent
Miller

(10) Patent No.: US 11,982,112 B1
(45) Date of Patent: May 14, 2024

(54) DOOR RESTRAINT

(71) Applicant: Charity Miller, McKinney, TX (US)

(72) Inventor: Charity Miller, McKinney, TX (US)

( * ) Notice: Subject to any disclaimer, the term of this patent is extended or adjusted under 35 U.S.C. 154(b) by 138 days.

(21) Appl. No.: 17/694,575

(22) Filed: Mar. 14, 2022

Related U.S. Application Data

(60) Provisional application No. 63/160,771, filed on Mar. 13, 2021.

(51) Int. Cl.
*E05F 5/02* (2006.01)
*E05C 17/02* (2006.01)

(52) U.S. Cl.
CPC .................................... *E05C 17/02* (2013.01)

(58) Field of Classification Search
CPC .......... E05C 17/46; E05C 17/52; E05C 17/60; E05C 17/64; E05C 17/02; E05C 17/04; E05C 17/08; E05C 17/20; E05C 19/06; E05F 5/06; E05Y 2201/224; E05Y 2201/222; E05Y 2900/132
USPC .................................... 16/82, 85, 86 R, 86 A
See application file for complete search history.

(56) References Cited

U.S. PATENT DOCUMENTS 990,114 A 4/1911 Crosskill
1,270,106 A * 6/1918 Bishop ............... B65H 75/4434 242/385.1
2,452,461 A 10/1948 Harris
3,969,786 A * 7/1976 Peak ......................... E05F 5/06 16/86 A
3,994,043 A * 11/1976 Gurzenda ................. E05F 5/06 16/86 A
4,159,837 A 7/1979 Morita
4,202,510 A * 5/1980 Stanish ................ A01K 27/004 242/384.7
4,269,439 A * 5/1981 Warwick ................. E05C 17/36 292/246
4,288,119 A * 9/1981 Geiger .................... E05C 17/36 292/262
4,532,672 A * 8/1985 Anderson ................. E05F 5/06 16/86 A
4,811,454 A 3/1989 Crook et al.
5,388,877 A * 2/1995 Wenk ....................... B66D 1/04 294/82.11
5,501,494 A * 3/1996 Willetts ................ E05C 19/182 292/288
5,540,468 A * 7/1996 Fassman ................ B65H 75/48 294/82.11
5,603,141 A * 2/1997 Gledhill .................... E05F 5/06 16/86 A
5,716,084 A * 2/1998 Sanford, Jr. .......... E05C 17/365 292/264
5,908,213 A * 6/1999 Tippetts ................ E05C 19/184 292/288

(Continued)

FOREIGN PATENT DOCUMENTS

DE 10213849 A1 * 10/2003 ............. H02G 3/121
JP 2021001524 A * 1/2021

*Primary Examiner* — Chuck Y Mah
(74) *Attorney, Agent, or Firm* — Kenneth L. Tolar

(57) ABSTRACT

A door restraint includes a base pad mounted on a wall adjacent to a designated door at a position where the doorknob would impact the wall if the door were fully opened. Attachable to the base pad is a housing having a deployable, spring-biased strap received therein. A loop at a distal end of the strap is secured to the doorknob to restrain the door in a fully opened position.

9 Claims, 3 Drawing Sheets

(56) References Cited

U.S. PATENT DOCUMENTS

| | | | | |
|---|---|---|---|---|
| 5,944,368 | A * | 8/1999 | Hastings | E05C 17/56<br>292/DIG. 19 |
| 5,964,385 | A * | 10/1999 | Simon | B65H 75/44<br>242/375 |
| 6,295,697 | B1 * | 10/2001 | Simon | E05F 5/02<br>16/86 A |
| 6,728,992 | B1 * | 5/2004 | Rogers | E05F 1/1041<br>16/86 A |
| 7,213,850 | B1 | 5/2007 | Diaz | |
| 9,623,806 | B2 * | 4/2017 | Rodriguez | B60R 7/043 |
| 2016/0047157 | A1 * | 2/2016 | Duff | E05F 5/06<br>16/85 |
| 2021/0095495 | A1 * | 4/2021 | Wesley | E05D 11/1014 |
| 2021/0123265 | A1 * | 4/2021 | Kaufmann | E05F 5/02 |

* cited by examiner

DOOR RESTRAINT

CROSS REFERENCE TO RELATED APPLICATIONS

This application claims priority of provisional application No. 63/160,771 filed on Mar. 13, 2021, the specification of which is incorporated herein by reference.

BACKGROUND OF THE INVENTION

The present invention relates to a device that restrains a door in a fully opened position, against an adjacent wall, to prevent accidents and injuries.

DESCRIPTION OF THE PRIOR ART

A partially opened door is a safety hazard, especially for children and pets. If fingers are inadvertently placed between either side edge of the door and the frame while the door is being shut, the fingers can be crushed, requiring extensive medical treatment and in some cases amputation. Moreover, an open door is an obstacle that creates a tripping hazard and the potential for head and limb injuries. A partially opened door can also be inadvertently slammed on a child standing within or near the doorway. If the door is heavy or moving quickly, any impact could cause serious injuries.

Pinch guards and similar accessories are attached to the free edge of the door to prevent complete closure. However, conventional door accessories are temporarily attached to the door and must be removed and stored when not in use. Moreover, they tenuously grip the door and can be easily displaced by sudden door movement or by a child or pet.

Accordingly, there is currently a need for a device that secures a door in a fully open position. A review of the prior art reveals a few devices that purportedly address some of the aforementioned problems. For example, U.S. Pat. No. 990,114 to Crosskill discloses a door latch comprising a ring attached to a door that is securable to a hook attached to an adjacent wall.

U.S. Pat. No. 2,452,461 to Harris discloses a door latch including a doorknob having a recess with a ledge therein. A hook mounted on a wall is securable to the ledge for fixing the door in an open position.

U.S. Pat. No. 4,159,837 to Morita discloses a door stop having a latching device attached thereto for gripping a shaft on the door to maintain the door in an open position.

U.S. Pat. No. 4,269,439 to Warwick, et al. discloses a device for maintain a truck door in an open position using brackets and cables.

U.S. Pat. No. 4,811,454 to Crook et al. discloses a door latch including elastic ring placed over a doorknob, a flexible belt mounted on an adjacent wall and a figurine interconnecting the ring and belt.

U.S. Pat. No. 5,908,213 Tippetts et al. discloses an elastic loop secured to a doorknob having a distal end with multiple attachment points that can adjustably grip a bolt secured to an adjacent wall.

U.S. Pat. No. 7,213,850 to Diaz discloses a door holder including a wire frame that is pivotal over a doorknob.

Although a few door restraints exist in the prior art, most require a first component to be attached to the wall and a second component to be secured to a door. Attaching the second component often requires adapting or reconfiguring the door or doorknob, which is laborious and costly. The present invention overcomes the disadvantages of the prior art by providing a restraint including a wall-mounted housing having an extendable strap that is securable to a doorknob to maintain the door in a fully opened position. When the strap is not in use, it can be conveniently retracted within the housing.

SUMMARY OF THE INVENTION

The present invention relates to a door restraint comprising a base pad mounted on a wall adjacent to a designated door at a position where the doorknob would impact the wall if the door were fully opened. Attachable to the base pad is a housing having a deployable, spring-biased strap received therein. A loop at a distal end of the strap is secured to the doorknob to restrain the door in a fully opened position.

It is therefore an object of the present invention to provide a door restraint for securing a door in a fully opened position, against an adjacent wall, to prevent accidents and injuries.

It is therefore another object of the present invention to provide a door restraint having a safety release to prevent tampering.

It is therefore yet another object of the present invention to provide a door restraint that also functions as a wall protector to prevent a doorknob from puncturing the adjacent wall.

Other objects, features, and advantages of the present invention will become readily apparent from the following detailed description of the preferred embodiment when considered with the attached drawings and the appended claims.

DESCRIPTION OF THE PREFERRED EMBODIMENT

Figures 1, 2, 2A, 3, 3A, 4, 5:
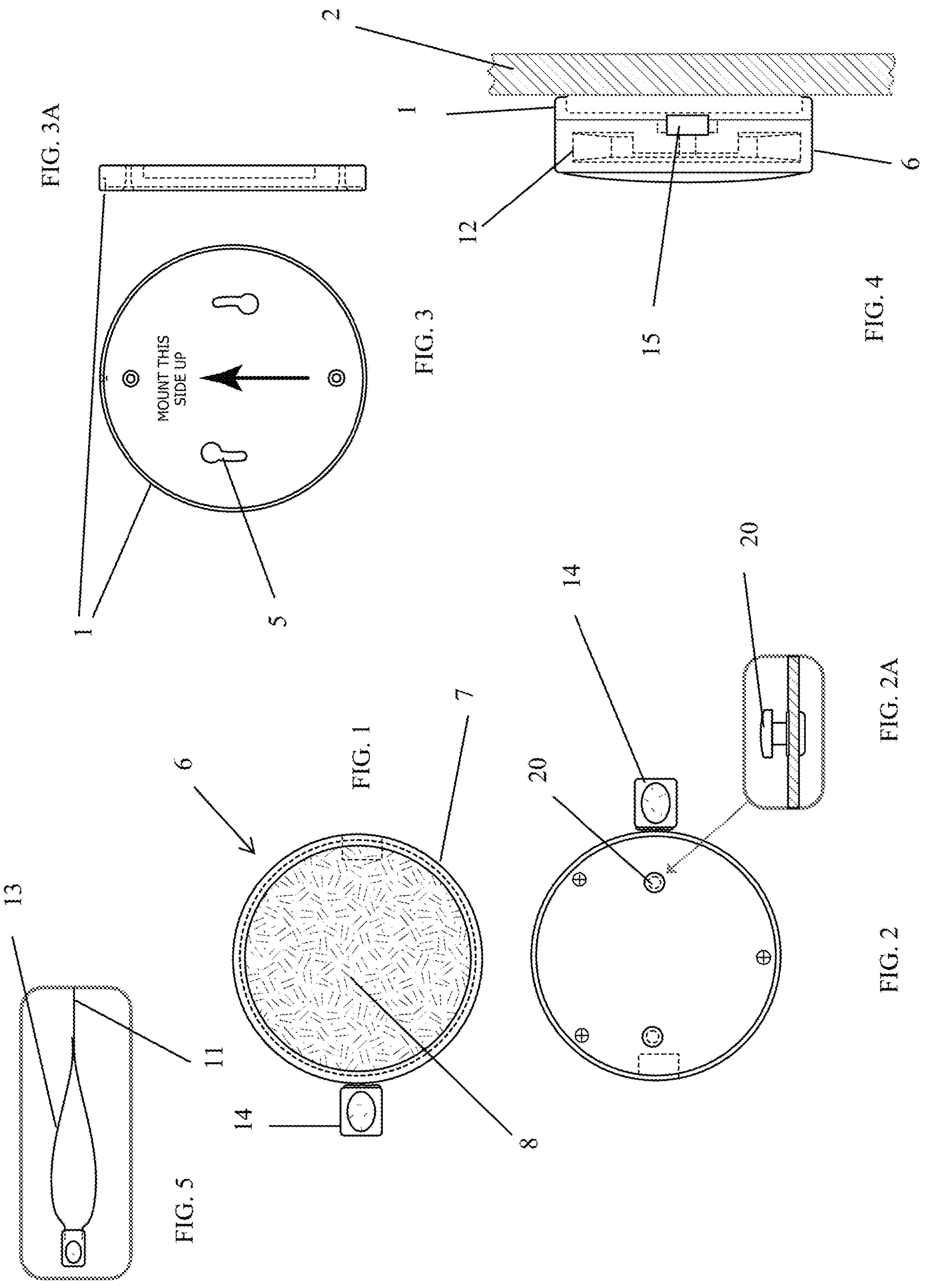
FIG. 1 is a front, plan view of the door restraint according to the present invention.
FIG. 2 is a rear view of the base pad.
FIG. 2A is an isolated, detailed view of an exemplary rivet.
FIG. 3 is an isolated view of the base pad.
FIG. 3A is a side view of the base pad
FIG. 4 is a side view of the door restraint attached to a wall.
FIG. 5 is an isolated view of the deployable strap.
Figure 6:
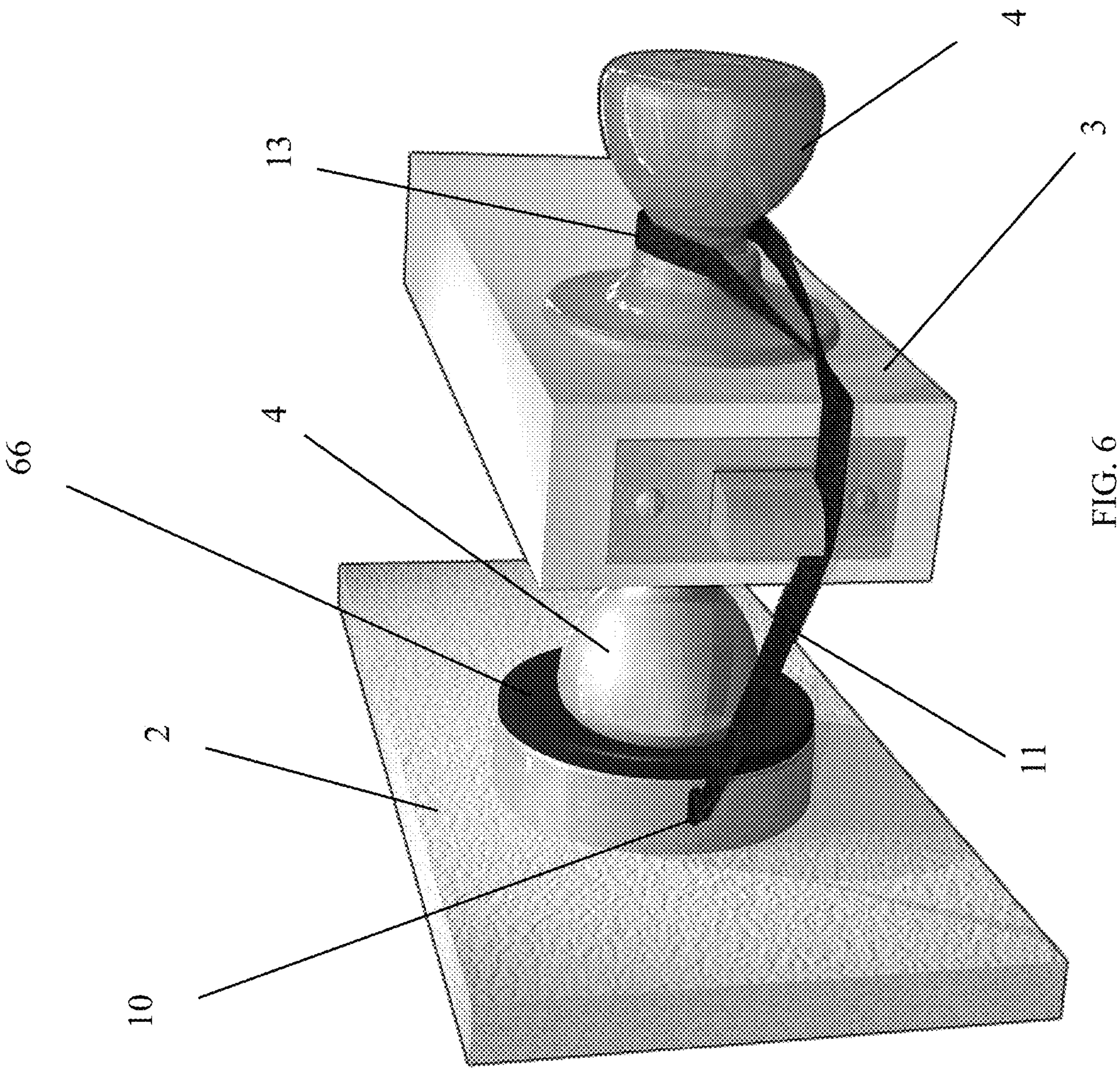
FIG. 6 depicts the device restraining a door in the fully opened position.
Figure 7:
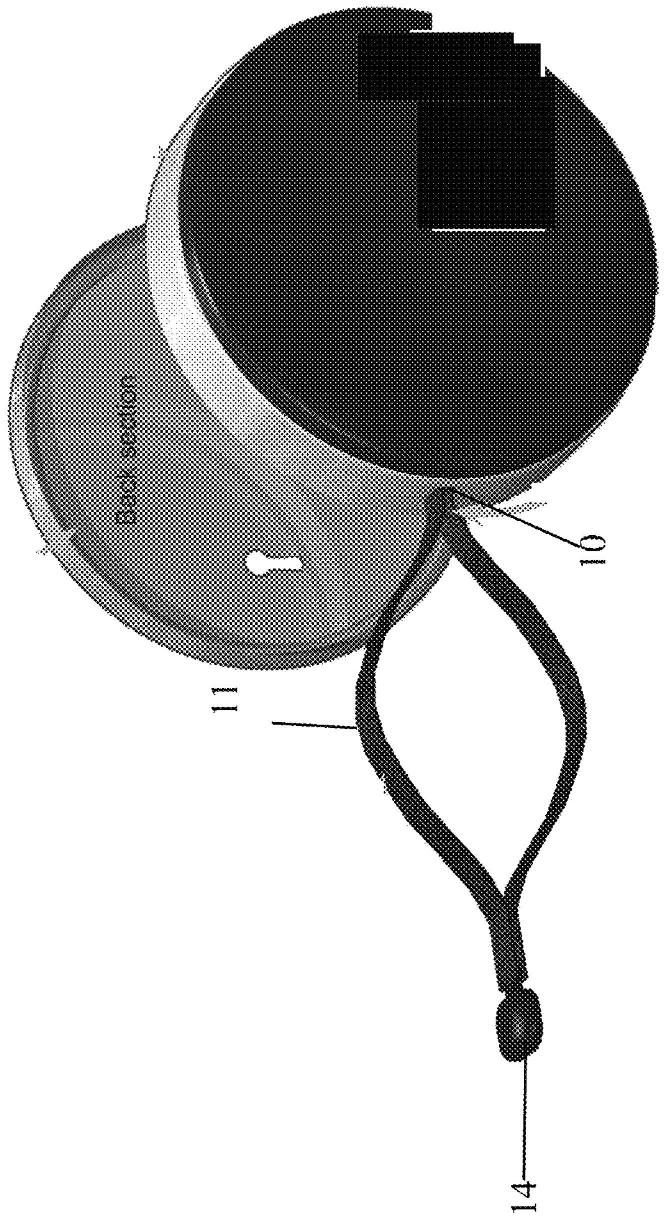
FIG. 7 is an exploded view of the door restraint.

The present invention relates to a door restraint comprising a base component 1 mounted on a wall 2, adjacent to a designated door 3 at a position where the outer doorknob 4 would impact the wall if the door were fully opened. The base component 1 includes a front surface having a plurality of keyways 5 for removably securing a deployable strap mechanism 6.

The strap mechanism 6 includes a circular housing 7 having a front wall, a rear wall, at least one peripheral edge and an interior chamber. Protruding from the rear wall are a plurality of T-rivets 20 that are positioned and configured to releasably slide within the keyways 5 on the base component. On the front surface of the housing is a pad 8 for absorbing the impact of the doorknob 4. Preferably, the pad includes a planar or convex surface 66 for receiving and conforming to the doorknob. Therefore, in addition to a door restraint, the device also functions as a wall protector that prevents the doorknob 4 from puncturing the adjacent wall 2. Extending from an opening 10 on the peripheral edge of the housing is a deployable strap 11 wound around a spring-biased spool 12. A distal end of the strap includes a loop 13 having a pull-tab 14 attached thereto that prevents the strap from being completely retracted within the housing interior. When the strap is retracted, it rests within a tapered slot that maintains the pull-tab parallel to the housing front surface to facilitate grasping by a user.

The housing further includes a security release button 15 that prevents a child from deploying or releasing the strap. The release button 15 actuates a spring-biased shaft that moves a latch pawl into and out of a pawl drive to releasably lock the spool. When the button is depressed, the spool is rotatable to permit extension of the strap while the spool retracts the strap as far as possible when the strap is subsequently released. When the button is released, the latch pawl reseats to lock the spool and prevents the strap from being extended or retracted.

To restrain a door, the user mounts the base component at a position where the outer doorknob 4 would impact the wall if the door were fully opened. The strap mechanism rivets 20 are inserted into the keyway and the housing is rotated to lock it in place. The user opens the door 3 fully, depresses the release button 15, and secures the loop 13 around the inner doorknob 25. When the strap 11 is released, the spring-biased spool 12 retracts it until the outer doorknob 4 is pulled against the strap mechanism 6 as depicted in FIG. 5.

The above-described device is not limited to the exact details of construction and enumeration of parts provided herein. For example, although the security lock has been primarily described as rachet pawl mechanism, it could also include a tension mechanism with a manual lock and unlock feature, an automatic lock that utilizes a retractor mechanism with a release mechansim, a ratchet gear that keeps the spool locked until released by a user, or any similar equivalent. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. A door restraint comprising:

a base component mounted on a wall, adjacent to a door at a position where an outer doorknob impacts the wall if the door were fully opened, said base component including a front surface having a plurality of keyways thereon;

a housing having a front wall, a rear wall, and at least one peripheral edge;

a plurality of rivets on the rear wall of said housing, said rivets positioned and configured to releasably slide within said keyways;

a deployable strap received within said housing and wrapped around a spring-biased spool, said strap having a loop at a distal end for securing to a doorknob to maintain said door in an open position.

2. The door restraint according to claim 1 further comprising a pad on the front surface of said housing for absorbing impact from the doorknob thereby preventing the doorknob from puncturing said wall.

3. The door restraint according to claim 2 wherein said pad includes a planar or convex outer surface for absorbing impact from the doorknob.

4. The door restraint according to claim 1 further comprising a pull tab attached to said loop that prevents the strap from being completely retracted within the housing interior.

5. The door restraint according to claim 4 wherein said pull tab rests within a tapered slot that maintains the pull-tab parallel to the housing front surface to facilitate grasping by a user.

6. The door restraint according to claim 1 wherein said housing further includes a security locking mechanism that prevents a child from deploying or releasing the strap.

7. The door restraint according to claim 6 wherein said security locking mechanism includes a release button on said housing.

8. The door restraint according to claim 7 wherein said release button actuates a spring-biased shaft that moves a latch pawl into and out of a pawl drive to releasably lock the spool, whereby when said button is depressed, the spool is rotatable to permit extension of the strap while the spool retracts the strap as far as possible when the strap is subsequently released, and when said button is released, the latch pawl reseats to lock the spool and prevents the strap from being extended or retracted.

9. The door restraint according to claim 1 wherein said deployable strap is biased in a retracted position.

* * * * *